C. S. SWAIM.
BICYCLE SUPPORT.
APPLICATION FILED APR. 8, 1911.
1,020,327.
Patented Mar. 12, 1912.
2 SHEETS—SHEET 1.
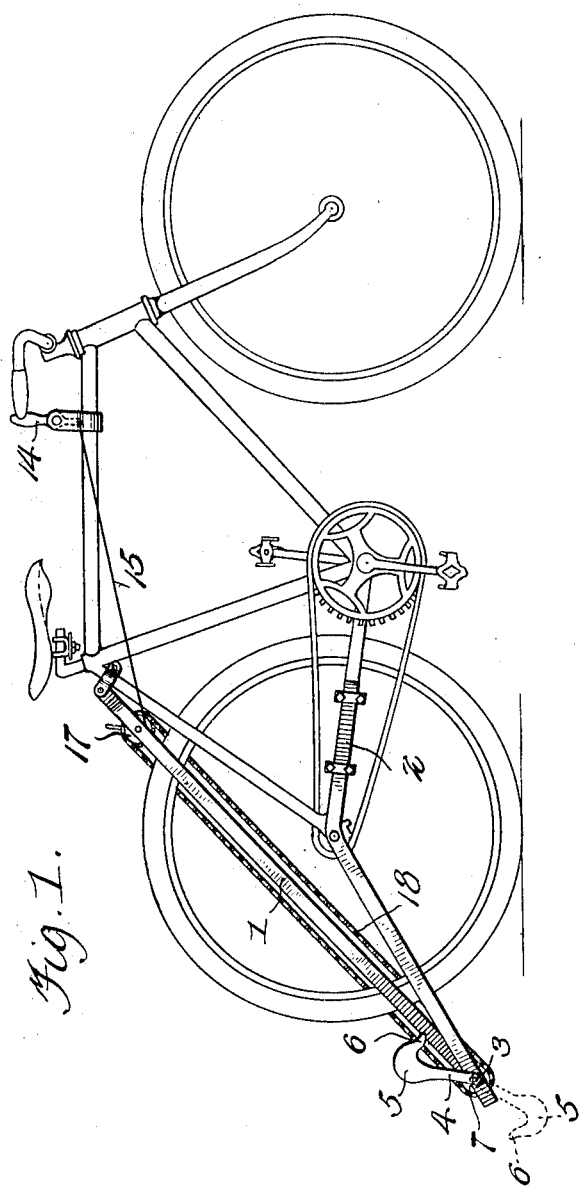
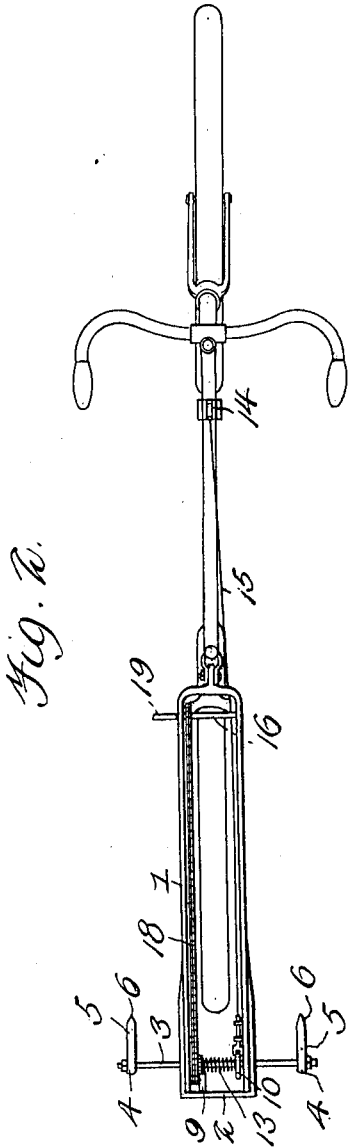
Witnesses
Hugh H. Ott
V. B. Hillyard.
Inventor
Charles S. Swaim
By Victor J. Evans
Attorney C. S. SWAIM.
BICYCLE SUPPORT.
APPLICATION FILED APR. 8, 1911.
1,020,327.
Patented Mar. 12, 1912.
2 SHEETS—SHEET 2.
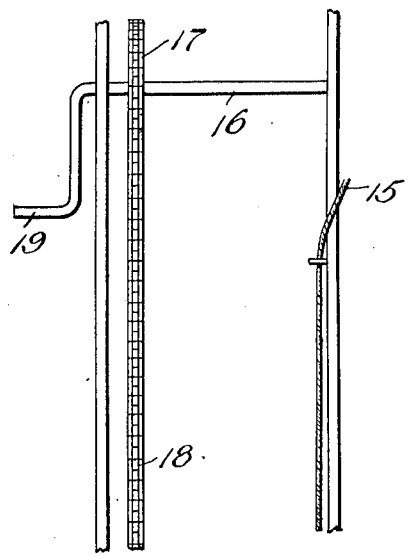
Fig. 3.
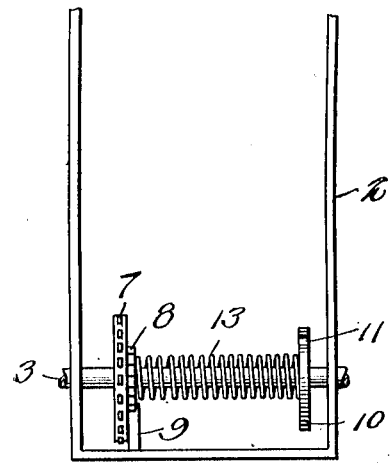
Fig. 4.
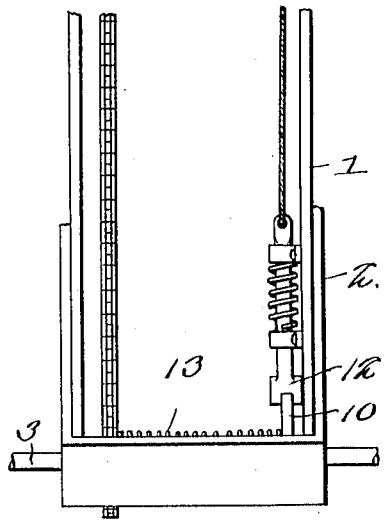
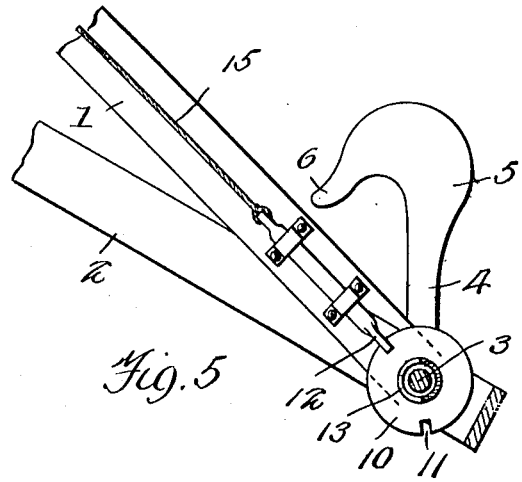
Fig. 5.
Inventor
Charles S. Swaim
By Victor J. Evans
Attorney
Witnesses
Hugh Hett
V. B. Hillyard

UNITED STATES PATENT OFFICE.

CHARLES S. SWAIM, OF LODI, CALIFORNIA, ASSIGNOR OF ONE-HALF TO PARLEY S. PIERCE, OF LODI, CALIFORNIA.

BICYCLE-SUPPORT.

1,020,327.   Specification of Letters Patent.   Patented Mar. 12, 1912.

Application filed April 8, 1911. Serial No. 619,746.

*To all whom it may concern:*

Be it known that I, CHARLES S. SWAIM, a citizen of the United States, residing at Lodi, in the county of San Joaquin and State of California, have invented new and useful Improvements in Bicycle-Supports, of which the following is a specification.

The primary purpose of this invention is the provision of a contrivance whereby a bicycle or analogous machine may be sustained in upright position when not in motion, thereby enabling the rider to mount or dismount while the machine is at rest, thereby diminishing the risk incident to mounting or dismounting while the machine is in motion.

A further purpose of the invention is the provision of an appliance which may be used as a brake to check the speed of the machine and which will form a reliable support for the machine when left unattended.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view, showing the application of the invention to a bicycle, the full lines showing the device out of action and the dotted lines showing the position of the device when used as a support. Fig. 2 is a top plan view of the parts shown in Fig. 1, the bicycle seat being removed. Fig. 3 is a rear view of the device on a larger scale, parts being broken away. Fig. 4 is a rear view of the lower portion of the attachment. Fig. 5 is a side view of the lower portion of the attachment, the frame, shaft and spring being in section.

Corresponding and like parts are referred to in the following description, and indicated in all the views of the drawings, by the same reference characters.

The device comprises two frames 1 and 2, the latter being secured to the lower reach bars of the bicycle frame and the former being attached to the seat post tube, or cluster. A shaft 3 is located at the juncture of the two frames 1 and 2 and is mounted therein so as to turn. Standards 4 are secured to opposite end portions of the shaft 3 and are provided at their lower ends with shoes 5, which are adapted to run upon the ground to check the speed of the machine when it is required to bring it to rest. The shoes 5 have points 6 at one end, which engage the ground so as to throw the standards 4 rearwardly at their lower ends, thereby lifting the rear wheel of the machine clear of the ground. A sprocket wheel 7 is mounted loosely upon the shaft 3 and is prevented from turning backward by means of a ratchet wheel 8 and a pawl 9, the latter being pivotally mounted upon the rear portion of the frame 2 and acted upon by a spring to hold its forward end in engagement with the teeth of the ratchet wheel 8. A wheel 10 is secured to the shaft 3 and has two notches, which are adapted to be engaged by means of a detent 12 so as to hold the shaft 3 in either one of two positions, that is with the standards 4 elevated, as indicated by full lines in Fig. 1, or with said standards lowered to hold the rear wheel of the machine clear of the ground, as indicated by the dotted lines in said Fig. 1. A coil spring 13 is mounted upon the shaft 3 and one end has connection with the sprocket wheel 7 and its opposite end is fastened to the shaft 3. The spring 13 is normally under tension and tends to rotate the shaft 3 to the right so as to throw the shoes 5 in contact with the ground. The detent 12 is preferably mounted so as to have a sliding movement imparted thereto and has connection with a lever 14 mounted upon the upper reach bar of the bicycle so as to be within convenient reach of the driver's seat. A connection 15 is interposed between the lever 14 and the detent 12. A shaft 16 is mounted upon the frame 1 and has a sprocket wheel 17. A sprocket chain 18 connects the sprocket wheels 17 and 7. The shaft 16 is adapted to be rotated by means of a crank 19 provided upon its outer end. Upon rotating the shaft 16 the sprocket wheel 7 is turned to wind the spring 13 to place the same under tension. The pawl 9 prevents unwinding of the spring by acting in conjunction with the ratchet wheel 8. The detent 12 engaging one of the notches 11 of the wheel 10 prevents forward movement of the shaft 3 and holds the same in either one of the two positions, that is in or out of operative position.

The frames 1 and 2 may be clipped or otherwise securely attached to the frame of the machine. These frames are of such construction and arrangement as not to interfere with the free operation of the machine or to add materially to the weight thereof.

The spring 13 is placed under tension by operating the shaft 16. When the support is not in active operation the standards 4 occupy a position to hold the shoes 5 clear of the ground. When it is required to bring the support into operative position the lever 14 is operated to disengage the detent 12 from a notch of the wheel 10, thereby releasing the spring 13, which, coming into play, turns the shaft 3 to lower the free ends of the standards 4 and bring the pointed ends of the shoes 5 into contact with the ground when a continued forward movement of the machine lifts the rear wheel thereof clear of the ground and carries the standards 4 beyond the vertical when the detent 12 will engage the next notch 11 of the wheel 10 and hold the support in the position indicated by the dotted lines in Fig. 1. The trailing of the shoes 5 upon the ground acts as a brake to bring the machine to rest besides serving to utilize the movement of the machine as means for lifting the rear wheel from the ground. When the operator desires to use the machine he simply mounts the same and operates the lever 14, which releases the wheel 10 and admits of the support moving out of the way and lowering the rear wheel into contact with the ground. After the operator has mounted the machine the drive wheel may be set in motion preliminary to releasing the support so that the instant the support is released the machine may start forward. It is to be remembered that the standards 4 when in position for supporting the machine incline downwardly and rearwardly, hence when the detent 12 is released by operating the lever 14 the shaft 3 is turned by the combined action of the spring 13 and the weight of the machine, the support being held in proper position by the detent 12 engaging the next notch of the wheel 10 in the forward rotation of the shaft 3.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In means for holding a bicycle in upright position, a support mounted upon the frame of the bicycle to rotate in the same direction to alternately throw the support into and out of operative position, and means for automatically engaging the support and holding it against rotation when moved to either an operative or an inoperative position.

2. In means for holding a bicycle in upright position, a support mounted upon the frame of the bicycle to rotate in the same direction to alternately throw the support into and out of operative position, means for rotating the support in one direction, and means for engaging the support to hold it in either an operative or an inoperative position, said means being under control of the rider.

3. In means for holding a bicycle in operative position, a support mounted upon the frame of the bicycle to rotate in the same direction to alternately throw the support into and out of operative position, a spring having connection with the support and tending to rotate the same in one direction, means under control of the rider for subjecting the spring to tension, and means for automatically engaging the support to hold it either in or out of an operative position.

4. In means for holding a bicycle in upright position, a support rotatably mounted upon the frame of the bicycle, a spring for rotating the support in one direction, means under control of the rider for subjecting the spring to tension, a detent mechanism for holding the support either in operative or inoperative position, and means under control of the rider for releasing the detent mechanism.

5. In means for holding a bicycle in upright position, the combination of a shaft, supporting means carried by the shaft, a spring having one end connected with the shaft, a wheel having the opposite end of the spring connected therewith, means for rotating the wheel for winding the spring, a ratchet mechanism for preventing backward rotation of the wheel, a detent mechanism for holding the shaft support either in operative or inoperative position, and means under control of the rider for releasing the detent mechanism to admit of automatic rotation of the shaft to throw the support into or out of operative position.

In testimony whereof I affix my signature in presence of two witnesses.

CHARLES S. SWAIM.

Witnesses:
AUSTIN MILLER,
EWALD H. STARK.